United States Patent Office 2,837,467
Patented June 3, 1958

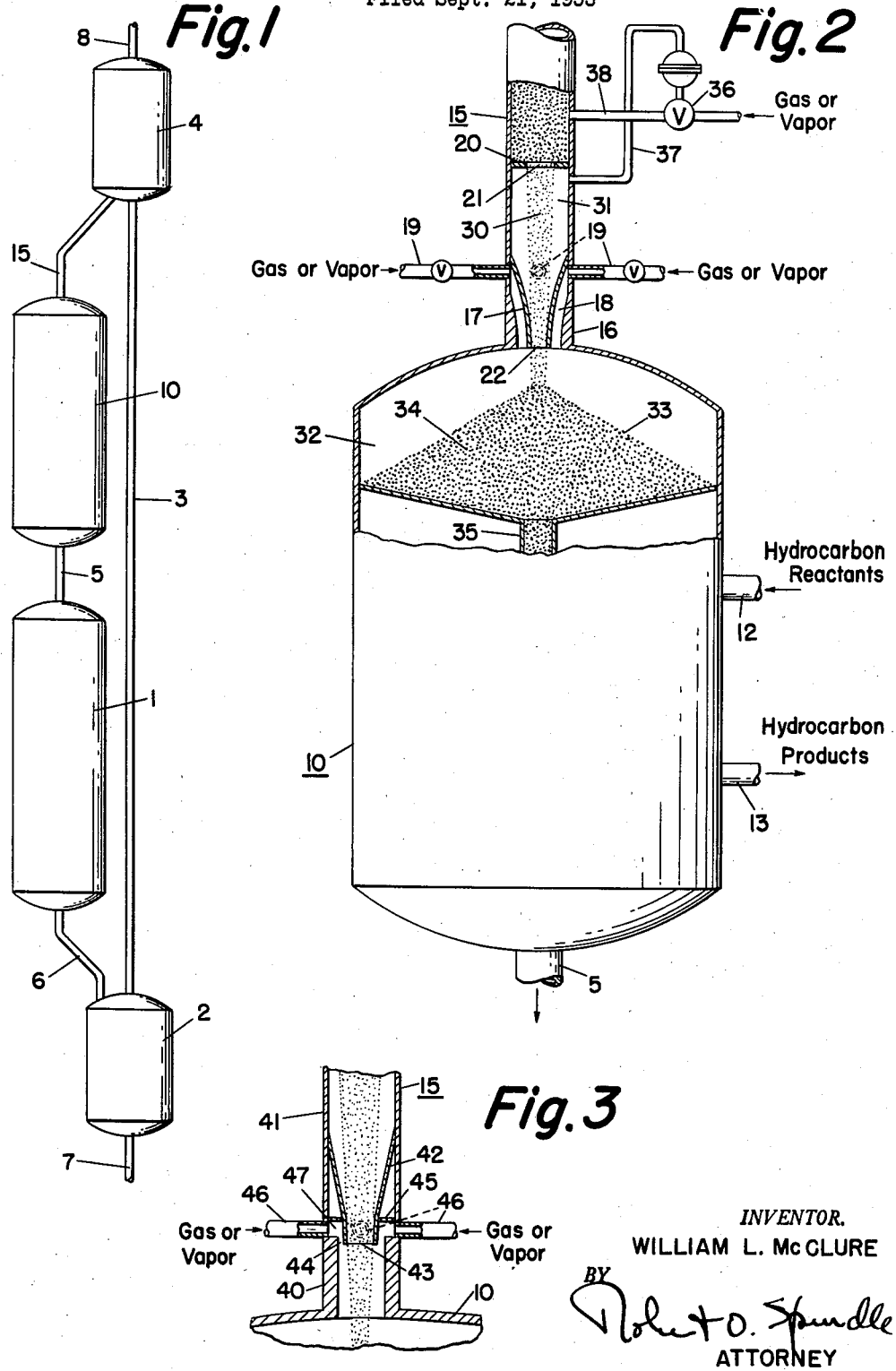

2,837,467
HYDROCARBON CONVERSION SYSTEMS

William L. McClure, Toledo, Ohio, assignor to Sun Oil Company, Philadelphia, Pa., a corporation of New Jersey Application September 21, 1953, Serial No. 381,185

5 Claims. (Cl. 196—55)

This invention relates to systems for the conversion of hydrocarbons and more particularly to a method of introducing granular conversion-supporting solid material into a vessel within such a system, e. g. the hydrocarbon conversion zone or the regeneration zone or the gas lift engaging zone of such a system.

In hydrocarbon conversion processes of the moving solids bed type, granular solids are gravitated as a compact mass through a conversion zone under elevated pressure wherein they are contacted by hydrocarbon material under conversion conditions to effect conversion thereof. The solids are then generally introduced into and gravitated through a regeneration zone as a compact mass and contacted therein with free-oxygen containing gas to effect combustion of carbonaceous material deposited on the solids during the conversion operation; the regeneration zone is also generally operated at elevated pressure, though usually not at as high a pressure as the conversion zone. The solids may be then introduced into a gas lift engaging zone or other elevating means.

In order to introduce granular solids into a conversion or regeneration zone or engaging zone as above described against the elevated pressures existing therein, it has heretofore been the practice to gravitate the solids as a compact mass through a vertically elongated, confined conduit known as a "seal leg" and thence into the conversion or regeneration zone, or engaging zone. In such operation, the height of the seal leg required depends on the amount by which the pressure of the zone into which the solids are discharged exceeds the pressure of the source of solids from which the seal leg receives the solids. The greater this amount of pressure, the longer the seal leg required. In hydrocarbon conversion systems, it frequently occurs that the seal legs must be quite long, and the expense of erecting the apparatus for the system is consequently substantially greater than it would be if the long seal legs were not required.

The present invention provides a manner in which excessively long seal legs can be avoided and the overall height of hydrocarbon conversion apparatus substantially reduced. Correlatively, the present invention provides a manner of using higher pressures in a system of given height.

According to the present invention, granular solids are introduced into the conversion or regeneration zone or engaging zone at elevated pressure as a falling stream, rather than as a gravitating compact mass. The falling solids enter an expanded zone through an orifice, and a stream of gasiform material is discharged downwardly into the zone from a position adjacent to and external of the falling solids stream as it emerges from the orifice. In operation according to the invention, the solids are enabled to enter the elevated pressure zone against a higher pressure than could be used in the case of compact solids gravitating through the same distance. Thus, for a seal leg of given height, the pressure against which the seal leg discharges can be substantially increased if the solids are introduced in the manner according to the invention, rather than in the conventional manner. Correlatively, in order to discharge against a given pressure, a shorter seal leg can be used if solids are introduced according to the invention. The distance through which the solids fall before entering the elevated pressure zone is preferably at least 2 feet in order to develop substantial increase in kinetic energy. Generally heights not greater than 20 feet will be used, though greater heights may be used if desired.

It is preferred, according to the present invention, to maintain the zone, through which the solids fall prior to introduction into the elevated pressure zone, at a pressure substantially lower than that in the elevated pressure zone. In order to accomplish this, it is necessary to provide an orifice between those two zones, which orifice has cross-sectional area approximately equal to the natural cross-sectional area of the falling stream of solids at the level where the falling stream enters the orifice. The orifice should not have cross-sectional area substantially less than the natural cross-sectional area of the falling stream; otherwise the passage of the falling stream through the orifice would be disadvantageously impeded. On the other hand the orifice should not have cross-sectional area substantially greater than the natural cross-sectional area of the falling stream; otherwise, excessive amounts of gasiform material would escape upwardly through the orifice and destroy the required pressure gradient between the zones. Although the orifice should not have cross-sectional area substantially greater than the natural area of the falling stream, the area of the orifice may be somewhat larger than the stream area.

By "natural" area, as referred to above, the area which the falling stream would have at the level in question if not artificially constricted, is meant. Although the orifice area should not be substantially less than the natural area of the solids stream, it may be somewhat less, particularly if the stream is gradually artificially constricted as it approaches the narrowest portion of the orifice, as described more fully in connection with the drawing.

The cross-sectional area of the falling stream of solids is not, of course, subject to precise measurement, since the solids at the periphery are subject to some random movement. However, according to the present invention, a falling stream which passes through a well-defined path as possible is obtained. In order to achieve this, it is preferred to maintain the cross-section of the solids stream, at the level where it begins to fall, in symmetrical and preferably circular, form, e. g., by passing it through an upper, circular orifice above which the solids are compact and beneath which they are in the form of a falling stream. Such falling stream will generally have a well-defined cross-section which gradually decreases in area as the solids fall. For this reason, it is frequently desirable that the lower orifice through which the stream passes into the elevated pressure zone, have lesser cross-sectional area than that of the upper orifice.

The invention will be further described with reference to the attached drawing, which illustrates apparatus by which the process of the invention may be carried out. Figure 1 shows a hydrocarbon conversion system including conversion and regeneration vessels and a gas lift unit for elevation of solids, but does not show any details of the invention, the latter being shown in Figures 2 and 3. Figure 2 shows the conversion vessel and apparatus for introducing solids thereinto. Figure 3 shows a modification of the apparatus for introducing solids.

Referring now to Figure 1: conversion vessel 10 is position above regeneration vessel 1 and gas lift engaging vessel 2 is positioned beneath regenerator 1. A gas lift conduit 3 extends upwardly from engager 2 to disengaging vessel 4, which is positioned above converter 10.

In operation, granular solids are gravitated from the lower end of disengager 4 through conduit 15, which has, as shown, an upper inclined portion and a lower vertical portion. The entire conduit may be vertical if desired, but it is essential that a substantial lower portion thereof be vertical, in order that the apparatus more fully described in connection with Figure 2 may be provided in such lower portion.

Granular solids after contacting with hydrocarbon material for conversion thereof in vessel 10, are gravitated from vessel 10 to vessel 1 through line 5, which also must be vertical, at least in a substantial lower portion thereof, if apparatus of the type shown in Figure 2 for the conduit 15 is to be provided for line 5.

Granular solids, after contacting with free-oxygen containing gas for regeneration of the solids in vessel 1, are gravitated from vessel 1 through line 6 to engager 2. Line 6 must be vertical, at least in a substantial lower portion thereof, if apparatus of the type shown in Figure 2 for the conduit 15 is to be provided for line 6. Lifting gas, e. g. air or flue gas, is introduced into vessel 2 through line 7, and lifting gas and granular solids pass upwardly through lift conduit 3 into disengager 4, wherein lifting gas is separated from solids and removed through line 8, granular solids being withdrawn again through line 15.

Referring now to Figure 2: conversion vessel 10 has an outlet 5 for granular solids, an inlet 12 for hydrocarbon reactants and an outlet 13 for hydrocarbon products of conversion. The vessel 10 may also have inlet means not shown for an inert gasiform purging medium at a level near the bottom of the vessel. Communicating with the upper end of vessel 10 are means for transporting solids from disengager 4 to vessel 10.

The means for transporting solids to vessel 10 include a conduit 15 having a lower portion 16 having reduced internal cross-sectional area. Positioned within conduit 15 and having its upper end secured to the inner wall of conduit 16 at an intermediate level therein is a conduit section 17 concentric with conduit 16 and having gradually downwardly decreasing cross section. The conduit 16 and the conduit section 17 both have their lower ends at the level of the top of vessel 10, conduit 16 having its lower end secured within an aperture in the top of vessel 10. Between conduit section 17 and the thickened inner wall of conduit 16 is a narrow annular passage 18 closed at its upper end and having its lower end open, and adjacent and surrounding the open lower end of conduit section 17. Communicating with an upper portion of annular space 18 are gas inlet pipes 19.

At a higher level in conduit 16 is positioned a transverse orifice plate 20 having circular aperture 21 therethrough, which aperture has greater cross-sectional area than that of the lower orifice 22 constituted by the open lower end of conduit section 17.

In operation, granular solids, e. g. 4–20 mesh synthetic silica-alumina cracking catalyst, are gravitated as a compact mass from disengager 4, which may be for example at approximately atmospheric pressure, into and through the upper portion of conduit 15. The solids then pass through aperture 21 in orifice plate 20 and fall therebeneath as a falling stream 30 having gradually downwardly decreasing cross-sectional area. The stream 30 falls through the enclosed zone 31 within conduit 16 and conduit section 17, which enclosed zone 31 has gradually downwardly decreasing cross-sectional area in a lower portion thereof. The falling stream then passes through orifice 22 into upper chamber 32 of vessel 10 and falls onto the upper surface 33 of compact bed 34 of solids which gravitates into and through conduit 35 and thence into a conversion chamber wherein they are contacted in conventional manner with hydrocarbon cracking stock introduced through line 12.

The cross-sectional area of orifice 22 may, if desired, be somewhat less than the natural cross-sectional area of the stream 30 at the level of orifice 22. The inclined wall of conduit section 17, in such case, provides a gradual constriction of the stream 30 without excessive attrition of solids by impingement on the wall.

A gasiform material, e. g. steam, is introduced through lines 19 into annular space 18 and discharged from the lower end thereof, preferably at high velocity, into chamber 32, traveling downwardly along the periphery of the stream of solids falling beneath orifice 22. The discharge of gasiform material as a jet from the lower end of annulus 18 tends to create a vacuum beneath orifice 22 and thus assists the passage of solids through orifice 22 and tends to prevent passage of gasiform material upwardly through orifice 22.

The pressure in chamber 32 is maintained substantially higher than the pressure in disengager 4. For example, the pressure in chamber 32 may be 10 p. s. i. g. In typical operation, a seal leg 50 feet high would have to be used to gravitate solids from a zone at atmospheric pressure to a zone at 10 p. s. i. g. In the operation described in connection with the drawing, however, the solids may be introduced into chamber 32 against 10 p. s. i. g. pressure even though the height of conduit 15 is substantially less than 50 feet, the high kinetic energy developed by acceleration of the solids as they fall through zone 31 enabling them to pass through the orifice 22 against the 10 p. s. i. g. pressure in chamber 32.

An inert gasiform material, e. g. steam, is introduced into an upper portion of conduit 15 through line 38 at a rate regulated by the setting of diaphragm valve 36, which setting is at least in part determined by the pressure in zone 31, as transmitted to the valve-setting mechanism through line 37. An increase in pressure in zone 31 causes the opening of valve 36 to increase so that more gas is introduced into the upper portion of conduit 15, whereas a decrease in pressure in zone 31 causes the opening of valve 36 to decrease so that less gas is introduced into the upper portion of conduit 15. Thus, a sufficient pressure gradient across the orifice plate 20 is maintained to provide continuous solids flow therethrough. At least a portion of the gasiform material introduced through line 38 passes downwardly through aperture 21, zone 31, and lower orifice 22 into chamber 32 of vessel 10.

In the foregoing description, the granular solids are described as being introduced into an intermediate chamber prior to introduction into the zone where contact with hydrocarbons takes place. It is to be understood that, alternatively, the solids can be directly introduced as a falling stream into the zone where contact with hydrocarbons takes place.

The foregoing description deals with introduction of solids into a hydrocarbon conversion vessel. In essentially the same manner, solids may be introduced into the regeneration vessel of the hydrocarbon conversion system or into the gas lift engaging vessel of such a system.

Turning now to Figure 3: a modification is shown therein of the lower portion of conduit 15. In this modification, gasiform material is discharged downwardly along the periphery of the falling solids stream and travels downwardly along the periphery of the solids stream through a confined passageway before being discharged into vessel 10.

In Figure 3, conduit 15 has a lower portion 40 having lesser cross-sectional area than that of the upper portion 41. Positioned concentrically within conduit 15 is conduit section 42 having gradually downwardly decreasing cross-sectional area and having its lower open end 43 extending slightly into lower portion 40 of conduit 15, so that an annular discharge nozzle 44 is provided between conduit section 42 and the thickened inner wall of lower portion 40 of conduit 15. A transverse plate 45 is secured to the inner wall of conduit 15 at a level somewhat above annular discharge nozzle 44, and conduit section 42 is secured within a central aperture in plate 45. Gasiform material inlet lines 46 communicate with the annular space 47 beneath plate 45 and above annular discharge nozzle 44.

In operation, granular solids, falling beneath an upper orifice such as that provided by aperture 21 in Figure 2, pass through lower end 43 of conduit section 42 and immediately thereafter are contacted with gasiform material, e. g. steam, introduced through lines 46 into annular space 44 and discharged through annular discharge nozzle 44 into the lower portion 40 of conduit 15. The gasiform material passes downwardly along the periphery of the falling solids stream through lower portion 40 of conduit 15 and by virtue of its downward velocity, tends to assist the passage of granular solids downwardly into vessel 10 and to prevent the passage of gasiform material upwardly from vessel 10 into and through the lower portion 40 of conduit 15 and through lower end 43 of conduit section 42.

It is noted that according to the present invention, substantially all of the solids which are introduced into the vessel in question may be introduced through the upper and lower orifices, no solids being introduced through any other source.

The method of the present invention may be used to introduce solids into any vessel of a hydrocarbon conversion system, though it is particularly advantageous for introduction of solids into the reactor or regenerator or engaging vessel.

The invention claimed is:

1. Method for introducing conversion-supporting granular solids into a vessel in a hydrocarbon conversion system which method comprises: passing granular solids comprising particles having size within the range 4 to 20 mesh downwardly as a compact moving bed through a confined zone; passing said solids downwardly through an upper orifice and vertically through an enclosed zone as a falling stream of solids passing through a well-defined substantially unobstructed path directly into and vertically through a lower orifice into said vessel, said lower orifice having cross-sectional area approximately equal to the natural cross-sectional area of said falling stream at the level of said lower orifice; maintaining the pressure in said vessel above the pressure in said enclosed zone passing a gasiform material downwardly through said enclosed zone and through said lower orifice with said solids; and discharging gasiform material downwardly into said vessel from a position adjacent to and external of said falling stream of solids as it emerges from said lower orifice.

2. Method according to claim 1 wherein said lower orifice has lesser cross-sectional area than that of said upper orifice.

3. Method according to claim 1 wherein inert gas is introduced into a sealing zone through which said solids pass prior to passage through said upper orifice, and wherein the rate of introduction of said inert gas is varied in accordance with the pressure in said enclosed zone, said rate of introduction being increased when said pressure in said enclosed zone increases, and said rate of introduction being decreased when said pressure in said enclosed zone decreases.

4. Method according to claim 1 wherein said upper orifice has circular horizontal cross section, and wherein granular solids are passed downwardly, after passing through said upper orifice, directly through said enclosed zone.

5. Method for introducing conversion-supporting granular solids into a vessel in a hydrocarbon conversion system which method comprises: passing granular solids comprising particles having size within the range 4 to 20 mesh downwardly as a compact moving bed through a confined zone; passing said solids downwardly through an upper orifice having circular horizontal cross section and then directly into and vertically through an enclosed zone as a falling stream of solids passing through a well-defined substantially unobstructed path directly into and vertically through a lower orifice having circular horizontal cross section and into said vessel, said lower orifice having cross-sectional area less than that of said upper orifice and approximately equal to the natural cross-sectional area of said falling stream at the level of said lower orifice; maintaining the pressure in said vessel above the pressure in said enclosed zone; passing a gasiform material downwardly through said enclosed zone and through said lower orifice with said solids; discharging additional gasiform material downwardly into said vessel from a position adjacent to and external to said falling stream of solids as it emerges from said lower orifice; introducing inert gas into a sealing zone through which said solids pass prior to passage through said upper orifice; and varying the rate of introduction of said inert gas in accordance with the pressure in said enclosed zone, said rate of introduction being increased when said pressure in said enclosed zone increases, and said rate of introduction being decreased when said pressure in said enclosed zone decreases.

References Cited in the file of this patent

UNITED STATES PATENTS

| 2,445,092 | Utterback | July 13, 1948 |
| 2,488,488 | Bergstrom | Nov. 15, 1949 |
| 2,695,265 | Degnen | Nov. 23, 1954 |